United States Patent [19]

Weber et al.

[11] 4,352,720
[45] Oct. 5, 1982

[54] PROCESS AND APPARATUS FOR THE PRODUCTION OF MOLDED METALLURGICAL COKE FROM COAL BRIQUETTES

[75] Inventors: Heinrich Weber, Recklinghausen; Kurt Lorenz, Hattingen; Horst Dungs, Herne; Klaus Urbye, Flaesheim, all of Fed. Rep. of Germany

[73] Assignee: Firma Carl Still GmbH & Co., KG, Fed. Rep. of Germany

[21] Appl. No.: 201,262

[22] Filed: Oct. 27, 1980

Related U.S. Application Data

[62] Division of Ser. No. 135,112, Mar. 28, 1980, Pat. No. 4,305,788.

[30] Foreign Application Priority Data

Apr. 5, 1979 [DE] Fed. Rep. of Germany ....... 2913666

[51] Int. Cl.³ .............................................. C10B 1/04
[52] U.S. Cl. .................................. 202/124; 202/228; 201/6; 201/9; 201/34; 201/39
[58] Field of Search .................. 202/95, 120, 124, 108, 202/227, 228

[56] References Cited

U.S. PATENT DOCUMENTS

| | | | |
|---|---|---|---|
| 2,167,099 | 7/1939 | Benezech | 201/9 X |
| 2,342,862 | 2/1944 | Hemminger | 202/95 |
| 2,556,154 | 6/1951 | Kern | 201/6 |
| 3,140,985 | 7/1964 | Schmalfeld | 201/9 |
| 4,050,990 | 9/1977 | Lorenz | 201/6 X |
| 4,110,169 | 8/1978 | Suzuki et al. | 201/6 |
| 4,115,202 | 9/1978 | Lorenz et al. | 202/108 |
| 4,142,941 | 3/1979 | Weber et al. | 201/6 |
| 4,145,274 | 3/1979 | Green et al. | 201/4 X |
| 4,231,844 | 11/1980 | Weber et al. | 201/6 |

FOREIGN PATENT DOCUMENTS

| | | | |
|---|---|---|---|
| 2654187 | 6/1978 | Fed. Rep. of Germany | 201/41 |
| 134958 | 4/1979 | German Democratic Rep. | 201/6 |

*Primary Examiner*—Norman Yudkoff
*Attorney, Agent, or Firm*—McGlew and Tuttle

[57] ABSTRACT

The process for the production of molded metallurgical coke from dried coal or fine coal mixtures with a low swelling index particularly highly volatile fine coal comprises mixing normal washed fine coal or fine coal mixtures of a grain size of from 0 to 10 mm and a swelling index of not more than 5 with a binder, pressing the mixture into briquettes, oxidizing the briquettes in a continuous material flow stream, and coking the oxidized briquettes continuously in an oven chamber by supplying indirectly and exhausting the coke oven gases with a temperature of 300° to 1200° C. The device for carrying out the process includes a vertically extending reactor housing having an oxidation chamber adjacent the top thereof with an indirectly heated vertical coking chamber directly below the oxidation chamber and with a cooling chamber directly below the coking chamber and including means for circulating heating gases into the coking chamber and then upwardly through the coking chamber and out adjacent the top of the coking chamber and into the oxidation chamber.

3 Claims, 2 Drawing Figures

PROCESS AND APPARATUS FOR THE PRODUCTION OF MOLDED METALLURGICAL COKE FROM COAL BRIQUETTES

This is a division of application Ser. No. 135,112 filed Mar. 28, 1980, now U.S. Pat. No. 4,305,788, issued Dec. 15, 1981.

FIELD AND BACKGROUND OF THE INVENTION

The invention relates in general to metallurgical operations and in particular to a new and useful device and process for the production of molded metallurgical coke from coal briquettes which are mixed from dried fine coals or fine coal mixtures with a low swelling index, particularly highly volatile fine coals, with a binder, and pressed to briquettes, rehardened, oxidized, coked and cooled.

A process for the production of molded metallurgical coke from highly volatile fine coal and a low swelling index is known, where the coal must be ground very finely, at any rate below 1 mm. After rehardening and oxidation, if any, of these briquettes which are produced from such coals with a binder, the coking is effected by direct heating, that is, by conducting hot combustion gases over the briquettes. A gas with a low calorific value is obtained which has only limited applications. A large amount of low-grade lean gas is obtained this way from the highly volatile coals. This also reduces the economy of the process. Direct heating causes a great loss of carbon by gasification or combustion, namely about a 4% loss.

In another known process for the production of molded metallurgical coke from highly volatile coal with a low swelling index, the coking of the "green" briquettes which can be subjected, if necessary, to an oxidizing after-treatment is effected discontinuously with indirect heat transfer.

In this process, as in the conventional chamber coking process, no measures to prevent emissions are provided or possible. Particularly during the filling of the coal, as well as during the discharge, cooling or quenching of the coke, emission of dust-containing gases, which contain partly combustible or harmful components, are unavoidable.

Emissions also appear to a greater extent because coke cakes frequently at the bottom end, that is, at the outlet of the oven chambers. The cakes must then be crushed by hand with great effort. Dust is produced, which is carried into the atmosphere. Besides, it is very difficult and expensive during the operation of the plant to seal filling hoppers, uptakes and chamber oven doors to such an extent that no gases with tar components can escape.

The above-mentioned methods are described in detail in the report BF V 31 096 of the Battelle Institute Frankfurt e.V.

Presently known methods have thus either a high heat consumption with long coking times and considerable emissions, or there are great carbon losses and only a low-grade lean gas is obtained which has an unfavorable effect on the economy of the operation, particularly when coal with high portions of volatile components is used.

SUMMARY OF THE INVENTION

The invention provides a new process for the production of molded metallurgical coke from dried coal or coal mixtures with a low swelling index, which can be carried out continuously and where no emissions appear and the heat consumption for the coking is much lower compared to the known methods, and where the specific output is higher than in known methods.

For the solution of this problem it is suggested to mix normal, washed, fine coal or fine coal mixtures, with a grain size of 0 to 10 mm and a swelling index of not more than 5 in the dry state, with binders and use them for the production of briquettes, and to oxidize the briquettes in the continuous material current, and to coke them then continuously in an oven chamber under indirect heat supply, and to exhaust the coke oven gas from the oven chamber with a temperature of 300° to 1200° C.

This continuous oxidation and coking can be so effected with simple means that emissions of gases to the outside are avoided. It suffices to this end to control the operation so that there is only a slight excess pressure at the point where the briquettes enter the process, and also at the outlet. In the coking zone of the coking chambers the excess pressure is about 5 to 15 m bar.

The process according to the invention is not limited, like the known methods, to medium and highly volatile fine coal with a low swelling index; according to the invention, coal mixtures of all types can be coked. Coals which have by themselves a higher swelling index can be so adjusted by the addition of other types of coal with a low swelling index, or by the addition of coke fines or petroleum coke, that the mixtures have a swelling index of not more than 5.

It is thus practically possible to coke any type of coal.

According to one embodiment of the invention, the coke oven gases are exhausted from the oven chamber with a temperature of 300° to 450° C. In this case the heat consumption for the coking is lower, compared to conventional coking methods, and the yield of higher grade excess coke oven gas is higher. Tars are also obtained which are used, as described more fully below, partly as binders for the coal briquettes in the coking process itself.

According to another embodiment of the invention, the coke oven gases are exhausted with a temperature of 800° to 1100° C. No tars and hydrocarbons and no phenols are obtained, because they are cracked before they leave the coking chamber. But no water of formation is obtained either because it is used up in the water reaction taking place in the oven chamber. If the gases are cooled indirectly as a result, there is no waste water problem. Naturally a gas with a somewhat lower calorific value is obtained, since the hydrocarbons, like methane, are cracked, and more hydrogen and carbon monoxide are contained instead in the coke oven gas.

The waste heat of the indirect heating phase can now be used in a known manner, e.g. for preheating the fine coal or in other stages of the process, e.g. for the production of superheated steam, for the storage bin for the briquette-binder, for example, if pitch-type binders are used.

The waste gases from the heating phase, which have a temperature of about 600° C., still contain about 2 to 6% oxygen. For this reason they are used according to the invention for the oxidation of the coal briquettes to be coked. This way the process according to the invention becomes particularly economical.

If the oxygen content of the waste gases from the heating phase is less than 2% by vol, in some cases, air is added preferably by means of air preheated by the heat from the process, so that they can be used as oxidation gases.

In the process according to the invention, a large amount of gas of high calorific value is generally obtained, a part of which can be used in the process itself for heating purposes. Beyond that excess gas of high calorific value is available for free disposal.

In order to prevent harmful emissions, the gas used in the process itself for heating purposes and for the production of oxidation and coal drying gases, is worked up and purified.

The process according to the invention can be so carried out that harmless waste gases from the heating phase can issue only at a single point, namely at the gas outlet of the coal predrying station. The cooling gases for the hot coke can be circulated over heat exchangers. They then give off their heat to the combustion air, for example, which is required for heating the coking chamber and also for heating the oxidation gas and there is still sufficient waste heat available to generate the steam required for the subsequent purification of the coke oven gas.

But it is also possible according to the invention to use a specially prepared or existing lean gas for the indirect heating in the coking process, e.g. blast furnace gas so that the total amount of the valuable coke oven gas from the coking process is available for other purposes.

In carrying out the process, the pressures in the oxidation stage are so adapted to the coking stage that only a small amount of valuable coke oven gas passes from the coking stage into the oxidation stage or vice versa; from the oxidation stage to the coking stage. Substantial gas losses are thus avoided.

As a link between the two stages can be provided, e.g. an impedance

According to another embodiment of the invention, a high-boiling tar fraction is used as a binder for the production of the briquettes which is mostly obtained in the first cooling stage to bring about the cooling of the coke oven gas with tar.

The coke oven gases leaving the oven chamber with about 300° to 450° C. are preferably cooled in three stages, in the first stage; mainly with circulating tar and only a small amount of water which evaporates completely and thus leaves no aqueous condensate. The tar obtained in this first cooling stage, which boils above 280° C., also contains almost the entire coal dust which is discharged from the coking chamber with the gas. The excess from this cycle of high-boiling dust-containing tar is preferably used without further preparation as a briquette binder in the process itself.

In the second cooling stage, the gas is cooled exclusively with circulating tar boiling under 280° C. to a temperature of 10° to 50° C. above the water dew point. Aqueous condensate is thus not yet obtained, so that large portions of the tar obtained are anhydrous and dust-free. Then it is further cooled, prepared and purified according to known methods.

Due to the preliminary cooling with tar in the process according to the invention, only a relatively small amount of aqueous condensate is obtained. This is particularly the case when the final cooling of the gas in the third stage is effected indirectly with cooling water. The device for the further cooling of the gas, particularly the tank separating the tarry and aqueous condensate, can therefore, be made correspondingly small.

If briquettes are used from a coal which requires no oxidation the oxidation stage can be carried out as a simple preheating stage.

The second and third cooling stage can also be combined to one stage, where the cooling of the gases under 250° C. can be effected according to known methods or in known devices, e.g. in cross tube coolers with preceding water atomization.

For controlling the temperature in the coking stage and also for setting a temperature gradient, a part of the waste gas from the heating phase can be returned, with advantage, in a cycle into the heating phase of the coking stage.

Because of the great excess of gas, it is not absolutely necessary to use the waste gases from the heating phase as oxidation gases. Without markedly reducing the economy of the process, a part of the coke oven gas or another fuel can be burnt, e.g. in a special combustion chamber, and the oxygen desired for the oxidation can be adjusted in the waste gas from the combustion, it is particularly advisable to circulate the oxidation gases.

The oxygen content can be easily adjusted. The combustion chamber is preferably designed as a separate and independent part. This procedure and arrangement is particularly advisable when different coals or coal mixtures of varying composition are used, and the operation of the plant must be varied with regard to the temperature, amount, and oxygen content of the oxidation gas, and be adapted to the coal or coal mixture.

For carrying out the process it was found advisable to arrange the oxidation chamber above the indirectly heated vertical oven chamber provided with heating flues. This way the two parts of the plant can be combined to a unit. The flues for the coke oven gas can be arranged, e.g. on the end faces of the oven chambers or along the longitudinal walls of the oven chamber as channels which are open at the bottom. They are preferably arranged at a level which corresponds to three quarters of the chamber height, measured from the base of the heating flue.

This embodiment is preferred when the coke oven gases are to be exhausted with a temperature of up to 450° C.

If the coke oven gases are to be exhausted with a temperature of 800° to 1100° C., it is advisable to arrange the gas drains of the coking chamber in the lower third of the heated chamber height, measured from the base of the heating flue.

Any type of press can be used for the production of the briquettes, e.g. roll presses, ring roll presses, edge runner presses, or extrusion presses. Roll presses are preferred, however, at this point because of their high throughput capacity.

In order to prevent emission practically completely, the oxidation chamber and the oven chamber are surrounded by a common jacket, e.g. a steel plate jacket and the inlet for the briquettes into the oxidation chamber and the outlet for the coke briquetted from the cooling chamber are secured by double locks.

According to the state of the art, all intermediate movements of the fine coal, of the binder, of the coal briquettes, and of the finished coke briquettes are reduced to the necessary minimum.

Accordingly it is an object of the invention to provide a process for the production of molded metallurgical coke from dried coal or fine coal mixtures with a low swelling index and particularly from highly volatile fine coal comprising mixing normal washed fine coal or fine coal mixtures of a grain size of from 0 to 10 mm and having a swelling index of not more than 5 with a binder, pressing the mixture into a briquette, oxidizing the briquettes in a continuous material flow stream, and coking the oxidized briquettes continuously in an oven chamber by supplying heat indirectly to the chamber and exhausting coke oven gases with a temperature of from 300° to 1200° C.

A further object of the invention is to provide a device for carrying out the process of producing a molded metallurgical coke which includes a vertically extending reaction chamber having an oxidation chamber adjacent the top thereof and indirectly heated vertical coking chamber below the oxidation chamber and a cooling chamber below the indirectly heated vertical coking chamber with means for circulating heating gases into the coking chamber and through the coking chamber and then outwardly and then into the oxidation chamber.

A further object of the invention is to provide a device for coking which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments are illustrated.

DESCRIPTION OF THE PREFERRED EMBODIMENTS

Figure 1:
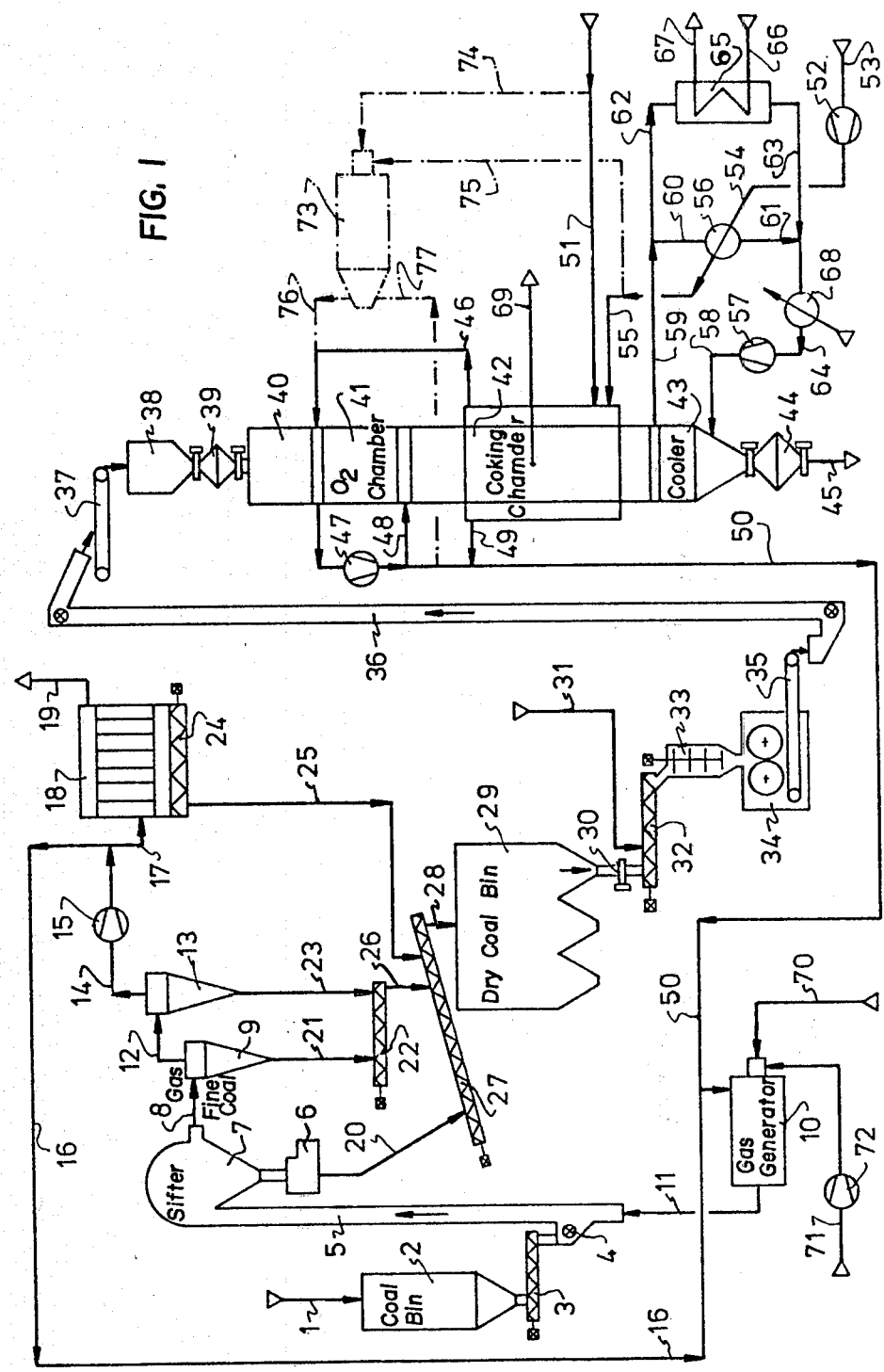
FIG. 1 is a schematic representation of a plan for carrying out the process for the production of molded metallurgical coke in accordance with the invention.

Referring to the drawings in particular, the invention embodied therein comprises a process for the production of molded metallurgical coke from dried coal or fine coal mixtures with a low swelling index and particularly highly volatile fine coal. In addition the invention includes a device for carrying out the process.

The quantitative data of the numerical example described below on the basis of the two diagrams refer to an hourly throughput for a large-scale operation.

An amount of 100 metric ton washed fine coal with the following properties: grain size equal to or less than 10 mm, volatile components b 28% waf, input moisture 10%, ash content 6%, are fed to a wet coal bin 2 over feed belt 1 and from there over a conveyor-type dosing weigher 3 and feed centrifuge 4 to the fly current drier 5 in which the coal is dried by an inert gas current (500° C. ab. 91,000 m$^3$n) fed from a hot gas generator 10 and line 11, to a residual water content of less than 1%. The units "m$^3$n" are cubic meter at standard temperature and pressure.

Only a part of the coal is ground in a hammer mill 6 following fly current drier 5, namely the part with a grain size of over 3 mm deposited at the head of the drier over sifter 7. The fly current drier is therefore, recommended as a particularly suitable drier. Naturally any other type of coal drier can be used (e.g. fluid bed, turbine, rotary drum drier, etc.).

The carrier gas with the fine coal not deposited by sifter 7 arrives through line 8 in material separator 9, from there over line 12 to a series-connected multiple dust arrester 13, and is returned over line 14, enhanced by fan 15, at a temperature of about 170° C. partly through lines 16 (25,000 m$^3$n) to hot gas generator 10 and partly through line 17 into a bag filter 18, from where about 78,000 m$^3$n purified waste gas are released over 19 into the atmosphere.

The predried coal is filled from hammer mill 6, material separator 9, multiple dust arrestor 13 and bag filter 18 over the outlet 20, 21 and 23 and conveyor screws 22, 24 and 27 and outlets 25, 26 and 28 into dry coal bin 29 in an amount of 90 tons at 120° C. The coal is fed over bin outlet 30 to a mixing screw 32 where it is mixed with about 6 tons binder (pitch, tar bitumen from butuminous coal and/or petroleum bitumen) from supply 31, and the mixture is shaped after treatment in a kneading machine 33 in a double roll press 34 to "green briquettes". The briquettes (96 metric tons, 120° C.) are brought to charging bin 40 by suitable conveyor devices 35 to 37 and filling buckets 38 and over lock chamber 39.

In a system closed by the two lock chambers 39 and 44, the briquettes slide continuously first through oxidation chamber 41, in which they are oxidized on the surface by hot flue gases with an oxygen content between about 2 to 6%, and through the indirect heated coking chamber 42 and then through cooling chamber 43 in which the hot molded coke of 1000° is cooled to 50° C. directly by a separate cooling cycle. 70 metric tons molded coke then leave the plant through lock chamber 44 and outlet 45.

For the oxidation of the green briquettes, about 75 to 80% of the combustion gases are removed from the indirect heating system of the coking stage through line 46 with 600° C. and blown in a cycle into the briquette charge enhanced by fan 47, through line 48 (290° C., 110,000 m$^3$n). The remaining 25 to 30% waste gases from the indirect heating system are combined over line 49 with the flue gases conducted through the oxidation chamber and conducted over return 50 with 360° C. in an amount of 54,000 m$^3$n to the hot gas generator 10 of fly current drier 5.

For the indirect heating of coking chamber 42, 9000 m$^3$n dry purified coke oven gas are supplied through line 51. The required combustion air (48,000 m$^3$n) is blown from the bottom through line 55 into the heating system of coking stage 42 by means of air blower 52 and lines 53/54 after heating in heat exchanger 56 (from 20° to 500° C.) which is connected with cooling stage 43.

In the cooling cycle, 120,000 m$^3$n are circulated by blower 57. The cooling gas is conducted through line 58 with 30° C. into cooling stage 43 and leaves the latter through line 59 with 600° C. About 40% thereof are conducted over lines 60/61 through heat exchanger 56 to preheat the combustion air, the balance serves to generate 23 t satuated steam with a pressure of 40 bar at 150° C. in the waste heat boiler 65 with steam tubes 66/67, and is cooled together with the 40% from heat exchanger 56 in an auxiliary cooler 68 from 200° C. to the inlet temperature of the cooling stage of 30° C., and fed to blower 57 through line 64.

Figure 2:
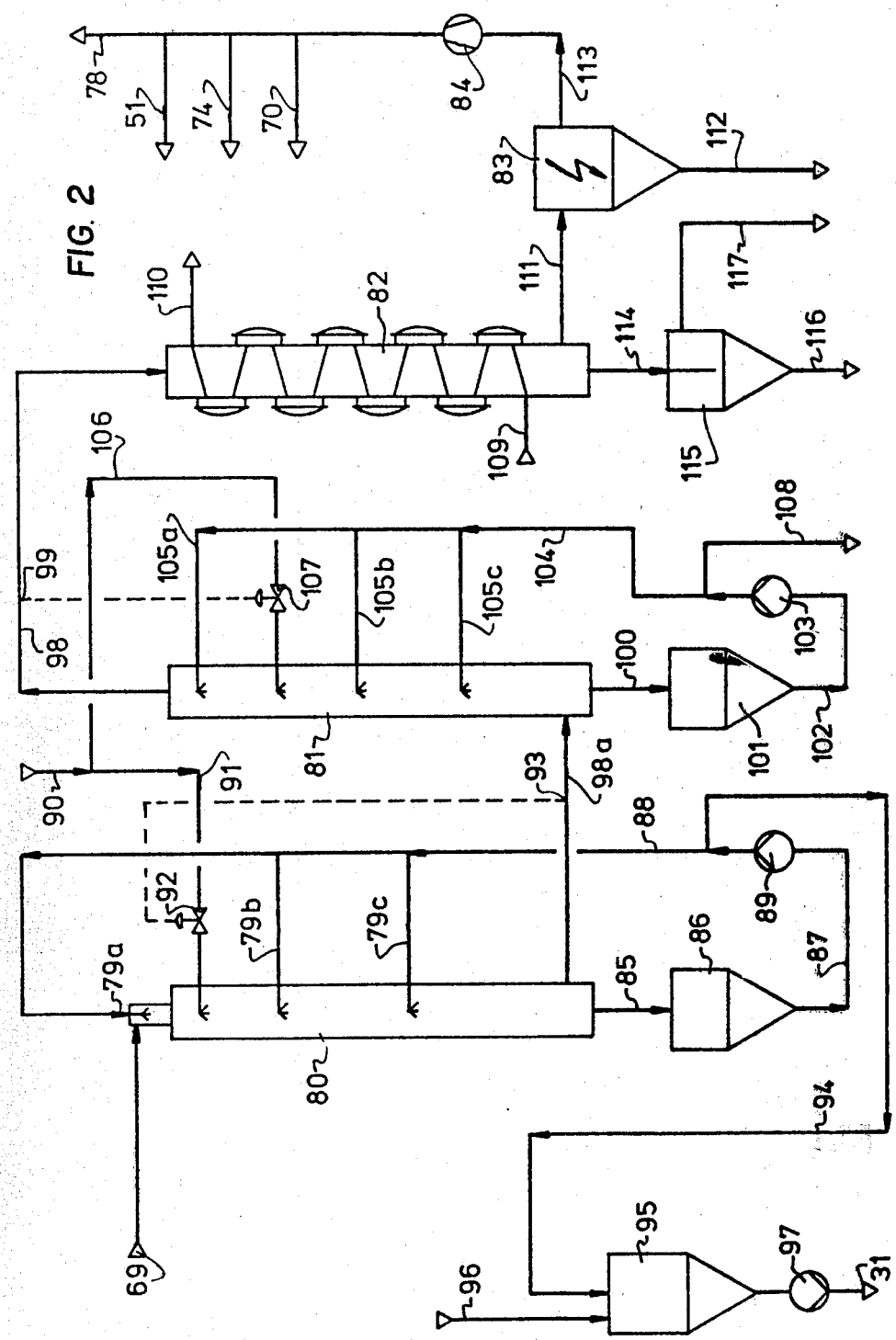
FIG. 2 is a diagrammatical view of a gas cooling and purification plan and a tar cycle to supplement the process of FIG. 1.

The crude gases formed in coking are removed on the end face of the coking shaft at about 75% of the heated height with 350° C. over line 69 and conducted to the gas cooling and purifying station shown in FIG. 2 with the respective tar cycle. The crude gas outlet is so dimensioned that all tar portions in the crude gas are vaporous to prevent condensation of higher boiling tar portions in the colder briquette charges which could lead to clogging. Of the crude gas formed during coking, an amount of 30,000 $m^3n$ remains after purification of which 9000 $m^3n$ are required for heating coking stage 42. 2200 $m^3n$ gas are supplied through line 70 to hot gas generator 10 together with 10,000 $m^3n$ combustion air through line 71 and blower 72. 18,000 $m^3n$ gas are thus in excess. They have a lower or net calorific value of Hu+4300 kcal/$m^3n$.

FIG. 1 also indicates by broken lines the possibility of producing with a special combustion chamber 73 a special oxidation gas with an adjustable oxygen supply by supplying the purified coke oven gas through line 74 and the respective air through 75 and circulating it over line 76/77 in oxidation stage 41.

The crude gas obtained during coking, is conducted successively over 69 for cooling as shown in FIG. 2 through the three cooling stages 80/81/82 before it is available, after liberation of fine dusts in electrofilter 83 and a pressure increase in gas exhauster 84 for drying, oxidation, coking and an excess (line 78).

The cooling of the crude gases is effected in the first cooling stage 80, a tar scrubber, in direct flow mainly with tar, which is circulated and charged through lines 79a, 79b, 79c from the top and at various levels into the scrubber and runs off at the bottom through line 85 into receiver 86 and is circulated through lines 87/88 with pump 89. At the same time such a small amount of water is added to the cooling system through line 90/91, controlled by valve 92 in dependence on the gas temperature measured at 93 at the transition from the first to the second cooling stage that complete evaporation of the water is ensured. Behind pump 89, about 3.5 metric tons excess crude tar are taken from the cycle and fed through line 94 to a mixing tank 95. Together with 2.5 metric tons bitumen added from outside the system through line 96, the required 6 metric tons binder are then conveyed with pump 97 through line 31 for briquetting.

The crude gas is introduced into the second cooling stage 81 at the bottom at 98a and conducted through line 98 with about 120° to 140° C. at the top to cross tube cooler 82. In a similar manner as in the first stage, the crude gas is cooled in the second stage by circulating tar and additional water (line system 99 to 107) in counter flow. At 108 a higher boiling tar is obtained which is to a great extent free of dust and water. From cross tube cooler 82 of the final cooling stage with cooling cycle 109/110 the gas flows with about 30° C. through line 100 to electrofilter 83, from which the remaining fine dust is removed over 112. The purified rich gas from flows through line 113 and exhauster 84 to the points of consumption. The tar obtained on cross tube cooler 82 and the remaining condensate flow over 114 into separator 115 and are obtained separately as an aqueous phase at 116, and as tar oils at 117.

While specific embodiments of the invention have been shown and described in detail to illustrate the application of the principles of the invention, it will be understood that the invention may be embodied otherwise without departing from such principles.

What is claimed is:

1. A device for the production of molded metallurgical coke from dried coal or fine coal mixtures with a low swelling index, comprising:
   means for forming briquettes;
   a vertically extending reactor with a common jacket having an oxidation chamber adjacent the top thereof for receiving the briquettes, an indirectly heated vertical coking chamber directly below the oxidation chamber and a cooling chamber disposed directly below the coking chamber for directly cooling the briquettes using a cooling gas ;
   means for circulating heating gases around said coking chamber and then upwardly across said coking chamber for indirect heating thereof, and into said oxidation chamber;
   a top double air lock chamber connected to a top of said oxidation chamber for admitting the briquettes; and
   a bottom double air lock chamber connected to a bottom of said cooling chamber for discharging briquettes;
   said means for circulating heating gases operating to supply the heating gases from around said coking chamber to said oxidation chamber with an oxygen content of about 2% to 6% to surface oxidize the briquettes directly;
   said coking chamber having an outlet for crude coke gas.

2. A device according to claim 1 wherein said coking chamber has a gas outlet at a level corresponding to ¾ of the height of said coking chamber.

3. A device according to claim 2 including crude gas purification means connected between said coking chamber outlet and an inlet to said means for circulating heating gases, for supplying purified crude coke gas to indirectly heat said coking chamber, said means for circulating heating gases including an additional inlet for receiving combustion air to be combined with said purified crude coke gas.

* * * * *